(12) United States Patent
Buza et al.

(10) Patent No.: US 9,586,534 B2
(45) Date of Patent: Mar. 7, 2017

(54) VEHICLE TRIM STRUCTURE

(71) Applicant: Nissan North America, Inc., Franklin, TN (US)

(72) Inventors: Jessica Buza, Riverview, MI (US); Paul Nguyen, Ridgeland, MS (US); Michael Eberlein, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 76 days.

(21) Appl. No.: 14/636,486

(22) Filed: Mar. 3, 2015

(65) Prior Publication Data

US 2016/0257266 A1 Sep. 8, 2016

(51) Int. Cl.
*B60R 7/04* (2006.01)
*B60R 13/02* (2006.01)
*B62D 65/14* (2006.01)

(52) U.S. Cl.
CPC ...... *B60R 13/0206* (2013.01); *B60R 13/0262* (2013.01); *B62D 65/14* (2013.01); *B60R 2013/0293* (2013.01)

(58) Field of Classification Search
CPC .............. B60R 7/04; B60R 2011/0007; B60R 13/0262; B60R 13/0206; B60N 2/4686; B62D 65/14
USPC ................. 296/24.34, 37.8, 37.14, 1.08, 191
See application file for complete search history.

(56) References Cited

U.S. PATENT DOCUMENTS

| | | | |
|---|---|---|---|
| 6,278,676 B1 * | 8/2001 | Anderson | B60R 7/04 296/37.8 |
| 6,428,072 B1 * | 8/2002 | Moore | B60K 37/00 224/483 |
| 7,766,377 B2 * | 8/2010 | Downey | B60R 21/232 280/728.2 |
| 7,802,831 B2 * | 9/2010 | Isayama | B60R 13/0262 296/24.34 |
| 7,874,603 B2 * | 1/2011 | Stoner | B60K 20/04 296/24.34 |
| 8,276,961 B2 | 10/2012 | Kwolek | |
| 8,414,048 B1 | 4/2013 | Kwolek | |

(Continued)

FOREIGN PATENT DOCUMENTS

| | | | | |
|---|---|---|---|---|
| DE | 102007016982 A1 * | 1/2008 | ......... | B60H 1/00564 |
| DE | 102015201412 A1 * | 7/2016 | ......... | B60R 13/0262 |
| FR | WO 2009118491 A1 * | 10/2009 | ......... | B60R 13/0262 |

*Primary Examiner* — H Gutman
(74) *Attorney, Agent, or Firm* — Global IP Counselors, LLP (57) ABSTRACT

A vehicle trim structure has a vehicle floor, a bracket assembly, a main body and a side trim panel. The vehicle floor has a plurality of first attachment parts located within a central region of a vehicle passenger compartment. The bracket assembly has a plurality of second attachment parts and at least one alignment pin. The plurality of second attachment parts are fastened to the first attachment parts. The at least one alignment pin is rigidly fixed to the bracket assembly. The main body has a horizontally extending slot along a leading edge thereof with the alignment pin being inserted into the horizontally extending slot positioning the main body relative to the bracket assembly and the vehicle floor. The side trim panel is installed to a side of the center console concealing the horizontally extending slot and the at least one alignment pin.

10 Claims, 13 Drawing Sheets

(56) References Cited

U.S. PATENT DOCUMENTS

| | | | |
|---|---|---|---|
| 8,474,214 B2* | 7/2013 | Dawe | F16B 5/0664 |
| | | | 24/289 |
| 8,517,447 B2 | 8/2013 | Biggs | |
| 8,641,120 B2 | 2/2014 | Zimmerman et al. | |
| 8,651,546 B2 | 2/2014 | Vasko et al. | |
| 2008/0001422 A1* | 1/2008 | Kwolek | B60R 13/0206 |
| | | | 296/24.34 |
| 2010/0283277 A1* | 11/2010 | Carnevali | B60R 7/04 |
| | | | 296/24.34 |
| 2012/0200105 A1* | 8/2012 | Vasko | B60R 7/04 |
| | | | 296/24.34 |
| 2013/0234463 A1* | 9/2013 | Vasko | B60R 7/04 |
| | | | 296/1.08 |
| 2015/0232043 A1* | 8/2015 | Buza | B60R 13/0206 |
| | | | 296/24.34 |

\* cited by examiner

VEHICLE TRIM STRUCTURE

BACKGROUND

Field of the Invention

The present invention generally relates to a vehicle trim structure that defines a center console assembly. More specifically, the present invention relates to a center console assembly with an attachment structure that simplifies installation.

Background Information

The center console assembly of a vehicle is a structure that is typically installed to the floor of the vehicle within the passenger compartment between two seats, such as the two front seats of the vehicle. The center console assembly includes various features, such as cup holders and storage areas or compartments for items such as maps and/or vehicle registration related papers.

SUMMARY

One object of the disclosure is to provide a center console assembly with an attachment structure that simplifies the installation process.

In view of the state of the known technology, one aspect of the present disclosure is to provide a vehicle trim structure with a vehicle floor, a bracket assembly, a main body and a side trim panel. The vehicle floor has a plurality of first attachment parts located within a central region of a vehicle passenger compartment. The bracket assembly has a plurality of second attachment parts and at least one alignment pin. The plurality of second attachment parts are fastened to the first attachment parts. The at least one alignment pin is rigidly fixed to the bracket assembly. The main body has a horizontally extending slot along a leading edge thereof with the alignment pin being inserted into the horizontally extending slot positioning the main body relative to the bracket assembly and the vehicle floor. The side trim panel is installed to a side of the center console concealing the horizontally extending slot and the at least one alignment pin.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
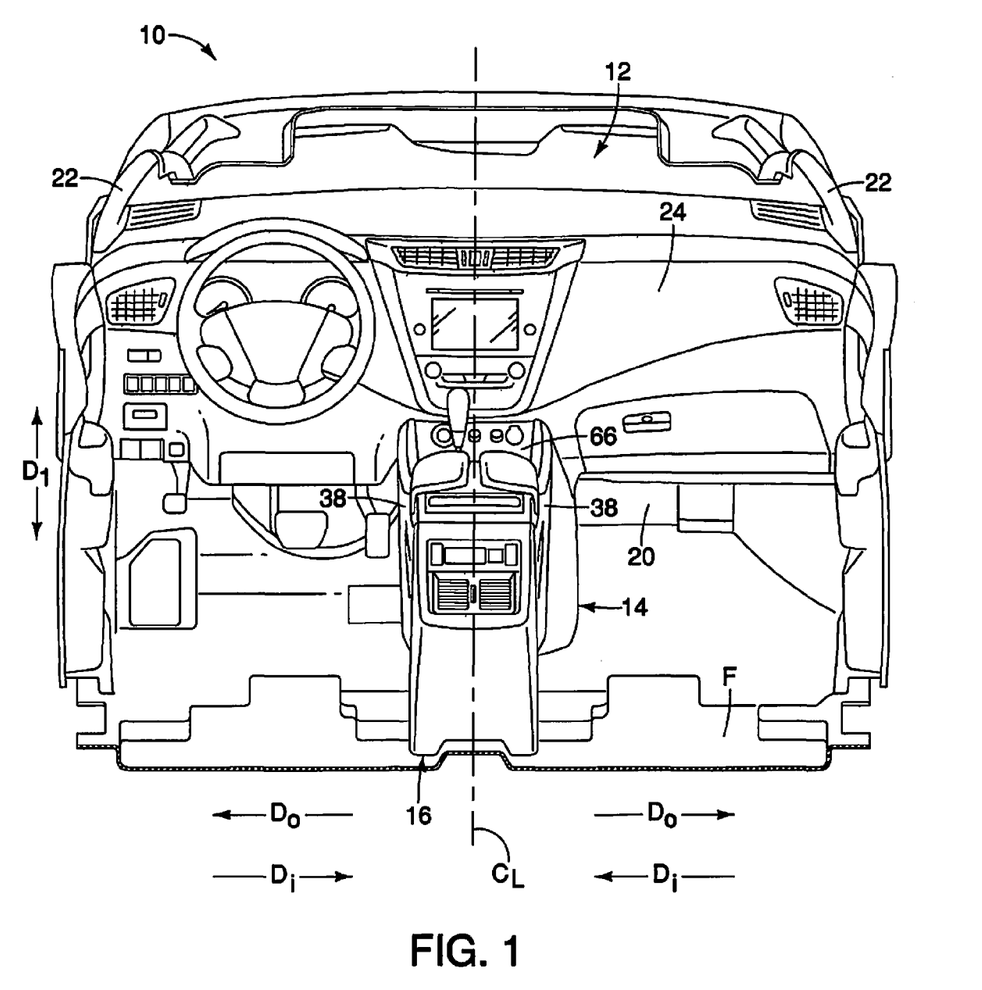
FIG. 1 is a perspective view of a passenger compartment of a vehicle showing a center console assembly attached to the floor within the passenger compartment in accordance with a first embodiment.

Referring initially to FIG. 1, a vehicle 10 with a passenger compartment 12 having a vehicle trim structure 14 that includes a center console assembly 16 is illustrated in accordance with a first embodiment.

The vehicle 10 includes many structural elements, such as a floor F, dash wall 20 and pillars 22 that at least partially define the passenger compartment 12. The vehicle 10 also includes an instrument panel 24 that is fixedly attached to the dash wall 20 in a conventional manner. Since the above mentioned vehicle structures (and other vehicle elements) are conventional features, further description is omitted for the sake of brevity.

The passenger compartment 12 is defined above the floor F and within the confines of the vehicle 10. Vehicle components such as seats (not shown) and the center console assembly 16 are directly attached to the floor F by, for example, mechanical fasteners. In the depicted embodiment, the center console assembly 16 is designed such that installation to the floor F is simpler and less time consuming that in conventional vehicle trim structure arrangements.

Figure 2:
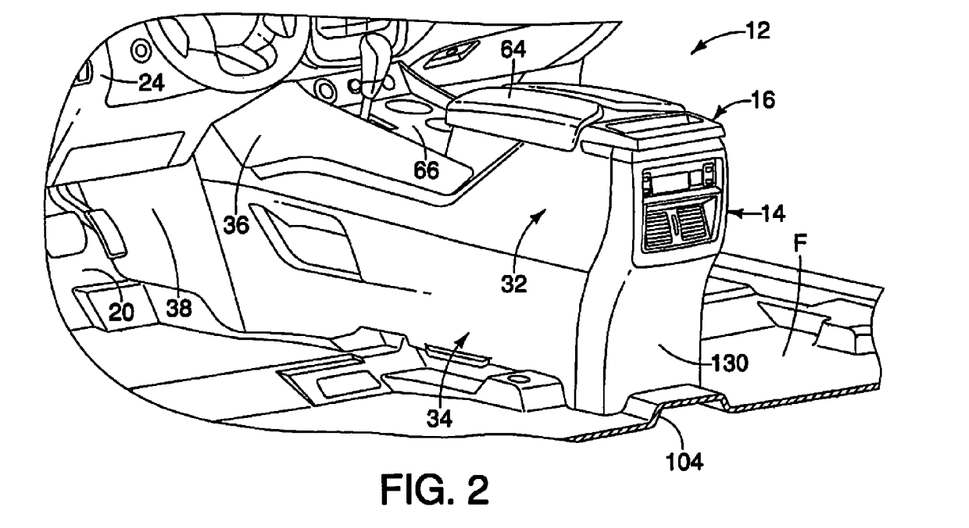
FIG. 2 is another perspective view showing one side of the center console assembly in accordance with the first embodiment.
Figure 3:
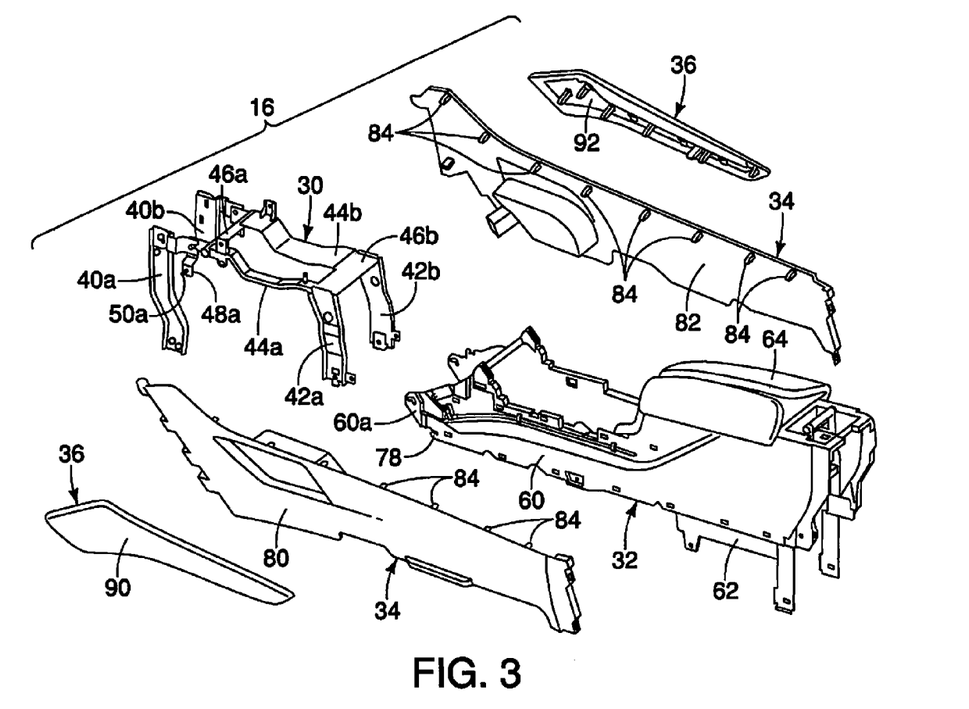
FIG. 3 is an exploded perspective view of the center console assembly showing a bracket assembly, a main body, lower side panels and upper side panels that attach to the main body in accordance with the first embodiment.

A description of the center console assembly 16 is now provided with reference to FIGS. 2 and 3. The center console assembly 16 basically includes a bracket assembly 30 (also referred to as an attachment assembly), a main body 32, lower side panels 34, upper side panels 36 and forward finishing panels 38 (only shown in FIGS. 1, 2 and 18).

Figure 4:
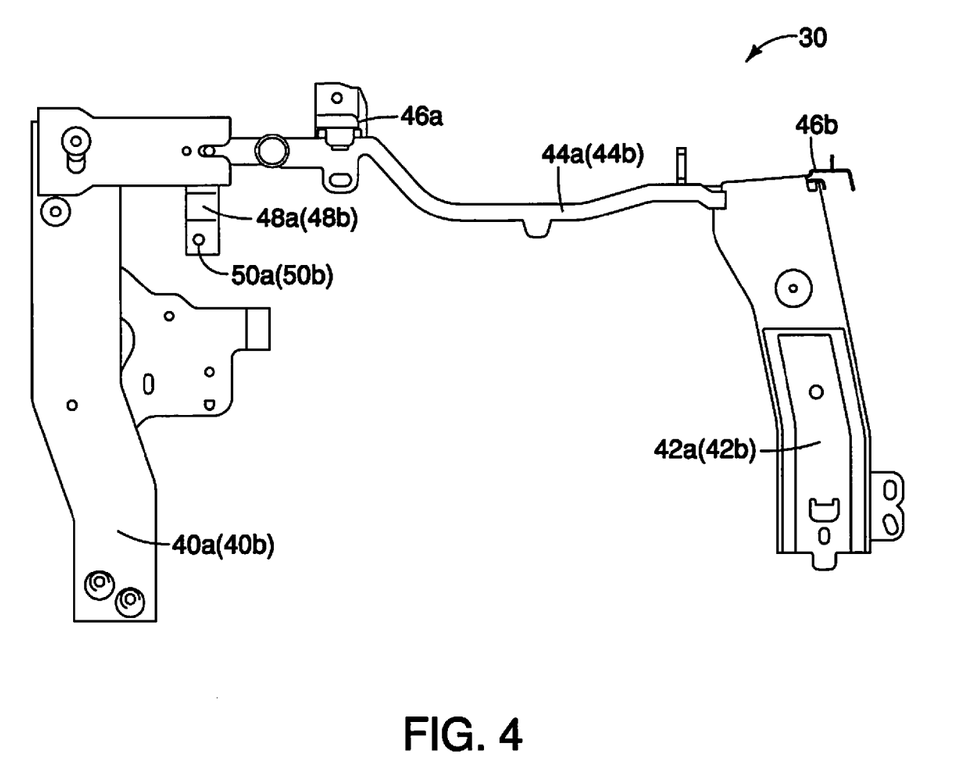
FIG. 4 is a side view of the bracket assembly showing a fixed protruding attachment fastener in accordance with the first embodiment.
Figure 5:
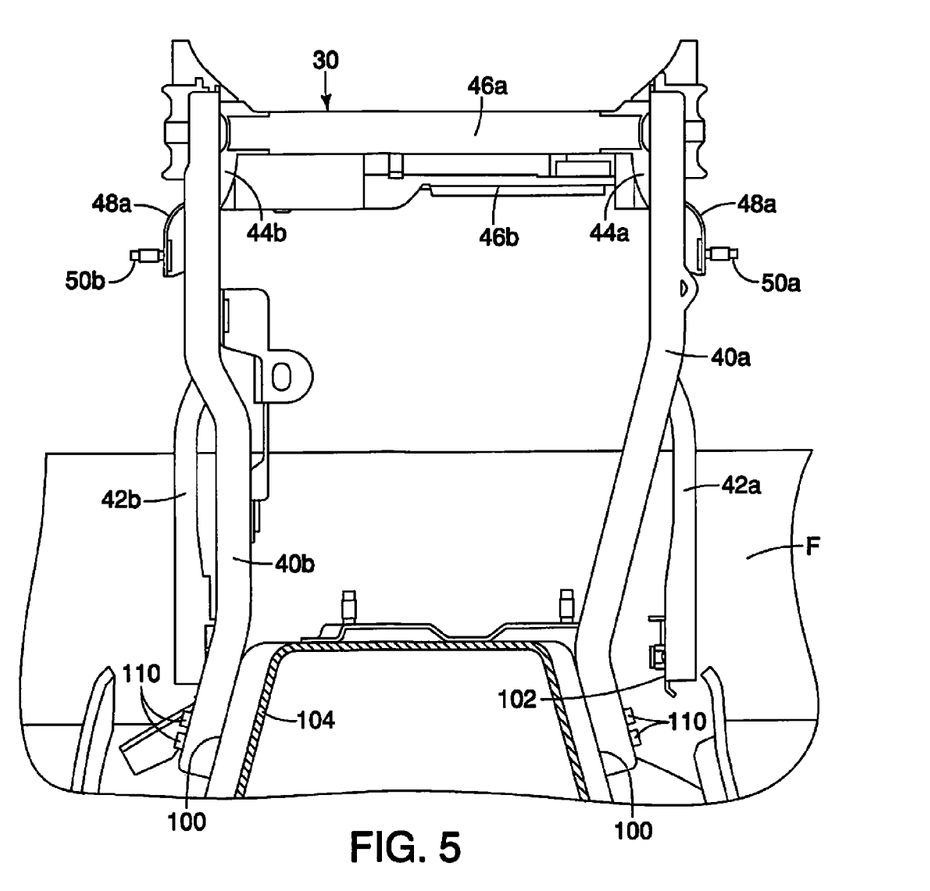
FIG. 5 is a front view of the bracket assembly shown installed to the floor of the passenger compartment in accordance with the first embodiment.

As shown in FIGS. 4 and 5, the bracket assembly 30 includes a plurality of brackets rigidly fixed to one another by, for example, welding techniques or mechanical fasteners. As shown in FIGS. 3 and 4, the bracket assembly 30 includes a pair of forward legs 40a and 40b, a pair of rearward legs 42a and 42b, a pair of side members 44a and 44b, cross-members 46a and 46b and attachment brackets 48a and 48b.

The forward legs 40a and 40b can be symmetrically shaped with respect to one another about the center line $C_L$ of the vehicle 10, but as shown in FIG. 5 can also each have their own individual flanges and embossments in order to securely support the fastening elements of the center console assembly 16.

Similarly, the rearward legs 42a and 42b can be symmetrically shaped with respect to one another, but can also each have their own individual flanges and embossments in order to securely support the fastening elements of the center console assembly 16.

Each of the side members 44a and 44b can be manufactured as a single element or as a plurality of elements fastened or welded together to define the depicted shapes. Further, the side members 44a and 44b can be symmetrically shaped with respect to one another, but can also each have their own individual flanges and embossments in order to securely support the fastening elements of the center console assembly 16. For instance, as shown in FIG. 3, the side member 44b has an overall width that is greater than the overall width of the side member 44a. A forward end of the side member 44a is fixedly attached to a top end of the forward leg 40a. A rearward end of the side member 44a is fixedly attached to a top end of the rearward leg 42a. Similarly, a forward end of the side member 44b is fixedly attached to a top end of the forward leg 40b. A rearward end of the side member 44b is fixedly attached to a top end of the rearward leg 42b.

The attachment between the side members 44a and 44b and the forward legs 40a and 40b, and the rearward legs 42a and 42b can be accomplished by mechanical fasteners, interlocking flanges and interlocking structures, welding techniques or combinations thereof. Further, it should be understood from the drawings and the description herein that the forward leg 40a, the side member 44a and the rearward leg 42a can be formed from a single sheet of metal that is pressed into a desired shape in order to achieve the bracket assembly 30. Similarly, the forward leg 40b, the side member 44b and the rearward leg 42b can be formed from a single sheet of metal that is pressed into a desired shape in order to achieve the bracket assembly 30.

The cross-members 46a and 46b are spaced part from one another in the vehicle longitudinal direction $D_1$. Specifically, the cross-member 46a extends from the side member 44a to the side member 44b at a location that is forward of the cross-member 46b but spaced apart from the forward legs 40a and 40b. The cross-member 46b extends from a rear end of the side member 44a to a rear end of the side member 44b. Each of the cross-members 46a and 46b has its own individual flanges and embossments in order to securely support the fastening elements of the center console assembly 16.

The side members 44a and 44b, and the cross-members 46a and 46b can be unitarily formed a single element, or can be separate elements rigidly fixed to one another to achieve the shape and structure of the bracket assembly 30.

The attachment bracket 48a is rigidly fixed to the side member 44a and extends in a downward direction from the side member 44a, as shown in FIG. 4. Similarly, the attachment bracket 48b is rigidly fixed to the side member 44b and extends in a downward direction from the side member 44b. As shown in FIG. 5, each of the attachment brackets 48a and 48b includes a corresponding stud 50a and 50b. The studs 50a and 50b are rigidly and non-movably attached to corresponding ones of the attachment brackets 48a and 48b. For instance, the studs 50a and 50b can be press-fitted into apertures (not shown) in the attachment brackets 48a and 48b and/or can be welded to the attachment brackets 48a and 48b.

The stud 50a extends in an outboard direction $D_o$ from the attachment bracket 48a and the stud 50b extends in the opposite outboard direction $D_o$ from the attachment bracket 48b. Hence, as shown in FIG. 5, the studs 50a and 50b extend in opposite ones of the outboard directions $D_o$. Further, each of the studs 50a and 50b extends away from the centerline $C_L$ of the vehicle 10 when installed to the floor F of the vehicle 10, as described further below. The studs 50a and 50b basically define alignment pins whose purpose is described in greater detail below.

The bracket assembly 30 further includes a plurality of attachment structures in the form of flanges with attachment hooks, flanges and/or fastener apertures that are described further below with the structures that attach to them. Specifically, the bracket assembly 30 includes structure for attachment to: the floor F, the main body 30, the lower main body 32, the lower side panels 34 and the forward finishing panels 38, as is discussed in greater detail below.

Figure 8:
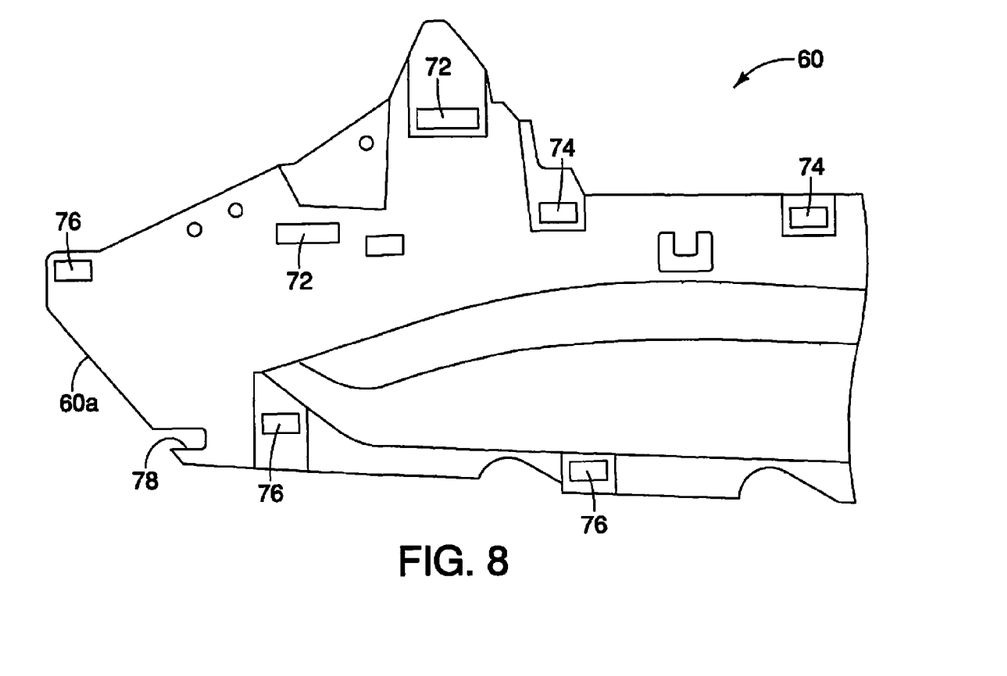
FIG. 8 is a side view of a front portion of the main body showing the slot in accordance with the first embodiment.

The main body 32 is basically a box-like structure that includes side panels 60, a storage compartment structure 62, a compartment lid 64 and, as shown in FIGS. 1 and 2, further includes a shifter trim panel 66. There are two side panels 60 incorporated into the structure of the main body 32, one on either side thereof. The side panels 60 are basically identical, except that they are symmetrically shaped with respect to one another. In other words, they are mirror images of one another. One of the side panels 60 is shown removed from other portions of the main body in FIG. 6. An enlarged forward portion of the side panel 60 is shown in FIG. 8 having a forward edge 60a. Since the side panels 60 are basically identical and have the same features, description of one of the side panels 60 applies equally to the other of the side panels 60.

Figure 6:
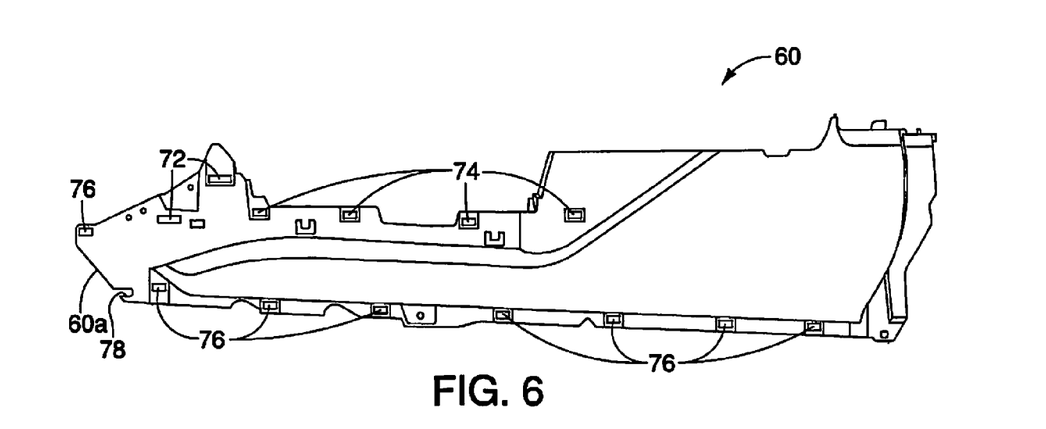
FIG. 6 is a side view of a panel of the main body shown removed from the main body, showing a forward attachment area that includes a slot in accordance with the first embodiment.
Figure 7:
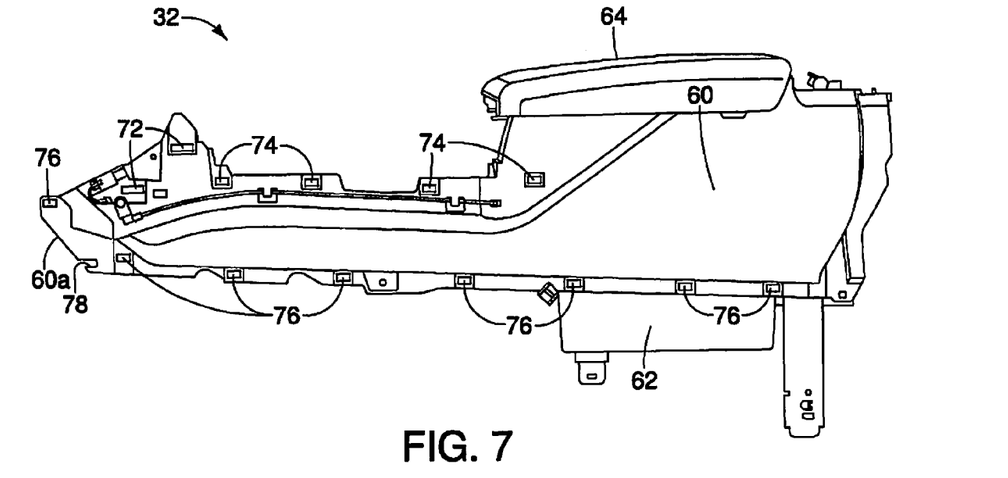
FIG. 7 is a side view of the main body showing the panel attached to additional structures that define the main body in accordance with the first embodiment.

The side panels 60 are rigidly connected to one another via the storage compartment structure 62 and additional conventional reinforcement structures whose description is omitted for the sake of brevity. As shown in FIGS. 6 and 7, the side panel 60 further includes a plurality of fastener receiving openings, such as openings 70, openings 72 and openings 74. As shown in FIGS. 6-8, and in particular in FIG. 8, the forward edge 60a (a lower leading edge) of the side panel 60 includes a horizontally extending slot 78. As is described further below, the slot 78 is positioned on the main body 32 such that the stud 50a (the alignment pin) inserts into a respective one of the slots 78 during installation of the main body 32. Specifically, with the bracket assembly 30 installed to the floor F, when the studs 50a and 50b are inserted into the slots 78 of the side panels 60 of the main body 50, the front portion of the main body 50 is sufficiently supported so that the side panels 60 and the storage compartment structure 62 can be fastened to the floor F, as described in greater detail below. Engagement between the studs 50a and 50b and the slots 78 allows the main body 32 to be properly located, aligned and positioned relative to the floor F during installation in a manner consistent with the design criteria of the vehicle 10.

As shown in FIG. 3, there are two lower side panels 34. The lower side panels 34 are identical except that they are symmetrically shaped with respect to one another. Specifically, the side panels 34 on either side of the main body 32 are mirror images of one another. Therefore, description of one side panel 34 applies equally to both side panels 34.

Figure 9:
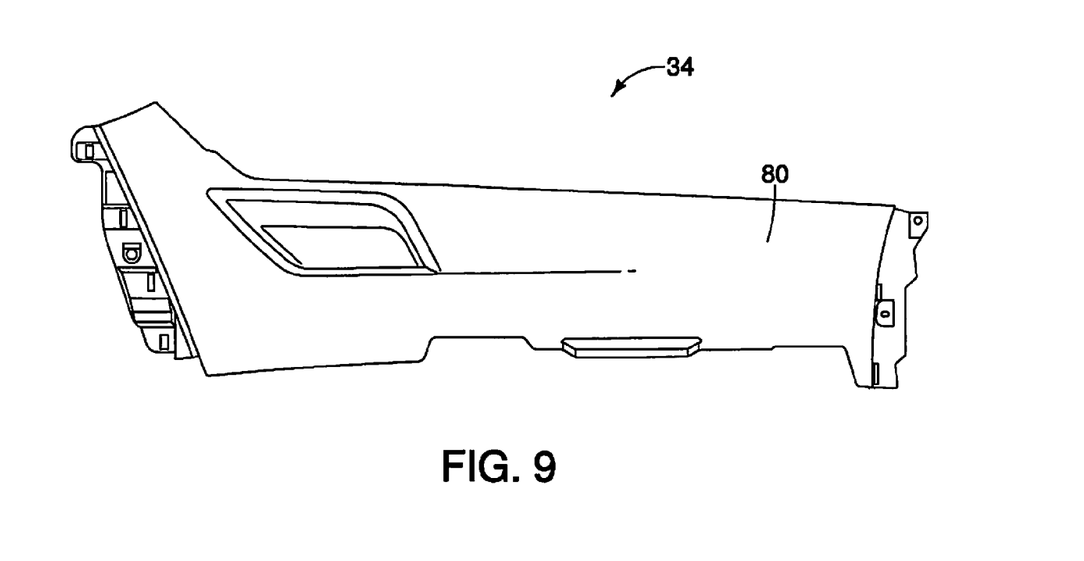
FIG. 9 is a side view of the lower body panel showing a finished outboard facing side thereof in accordance with the first embodiment.
Figure 10:
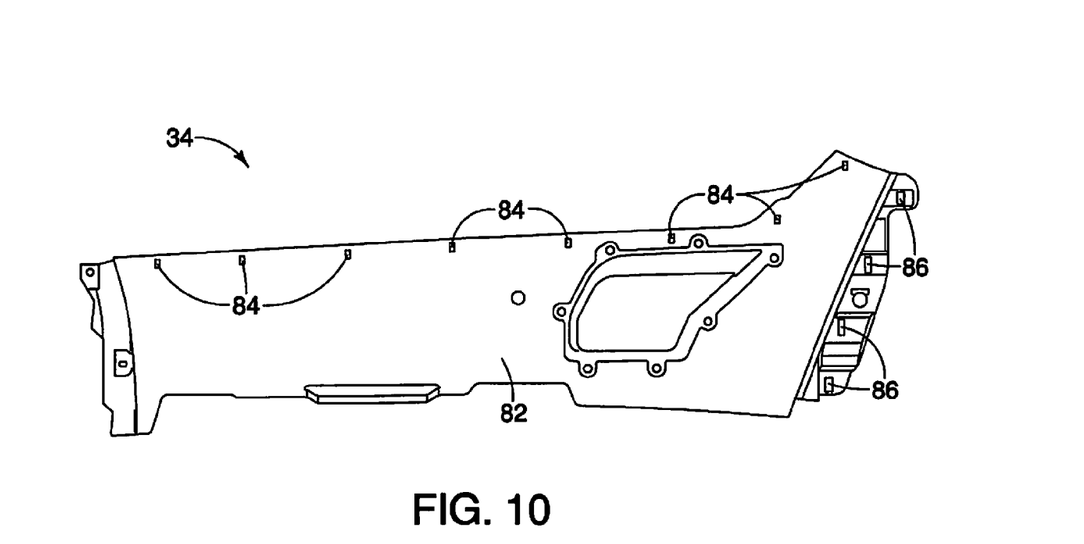
FIG. 10 is another side view of the lower body panel showing an inboard facing surface thereof in accordance with the first embodiment.

As shown in FIGS. 9 and 10, the lower side panel 34 has a finished side 80 (FIG. 9) and an attachment side 82 (FIG. 10). The finished side 80 can include a storage pocket and/or other decorative and functional features whose description is omitted for the sake of brevity. The attachment side 82 includes a plurality of fastening structures 84 in the form of snap fitting projections that are located relative to one another such that the can be inserted into the openings 76 formed in the side panel 60 of the main body 32 in order to secure the lower side panel 34 to the main body 32. However, it should be understood that the fastening structures 84 can be mechanical fasteners, or other mechanical devices for attaching the lower side panel 34 to the main body 32. A leading edge of the lower side panel 34 further includes a plurality of openings 86 positioned for attachment to the forward finishing panels 38.

As shown in FIG. 3, there are two upper side panels 36. The upper side panels 36 are identical except that they are symmetrically shaped with respect to one another. Specifically, the upper side panels 36 on either side of the main body 32 are mirror images of one another. Therefore, description of one upper side panel 36 applies equally to both of the upper side panels 36.

Figure 11:
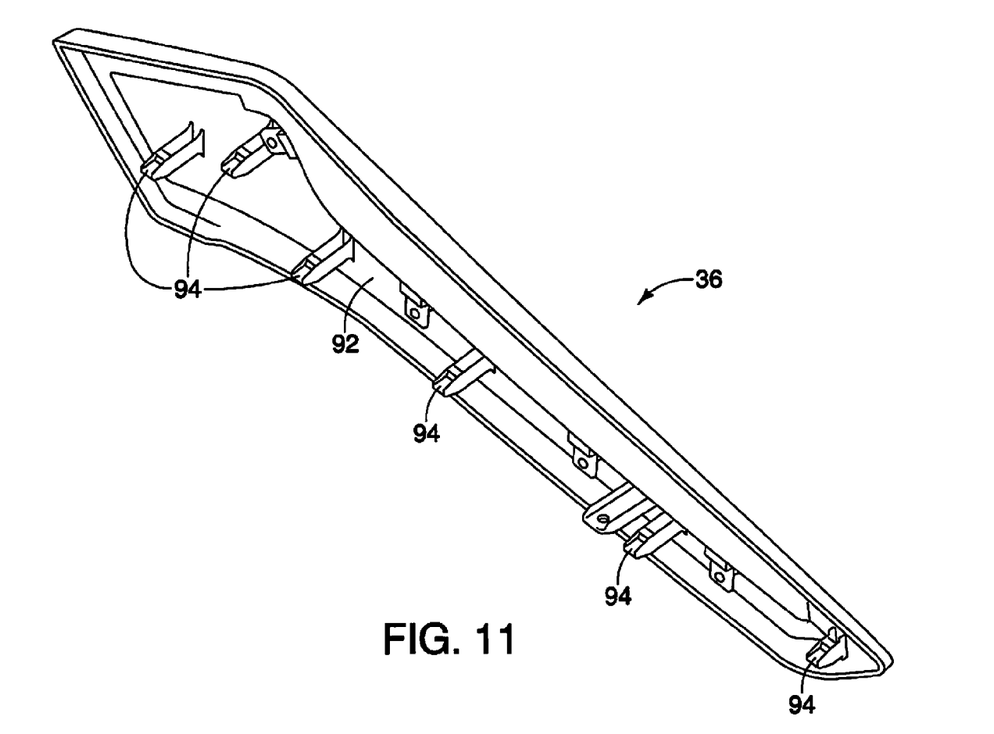
FIG. 11 is a perspective view of an inboard facing side of one of the upper side panels showing attachment projections in accordance with the first embodiment.

As shown in FIGS. 3 and 11, the upper side panel 36 has a finished side 90 and an attachment side 92. As shown in FIG. 11, the attachment side 92 includes a plurality of fastening structures 94 in the form of snap fitting projections that are located relative to one another such that the can be inserted into the openings 72 and 74 formed in the side panel 60 of the main body 32 in order to secure the upper side panels 36 to the main body 32. However, it should be understood that the fastening structures 94 can be mechanical fasteners, or other mechanical devices for attaching the upper side panels 36 to the main body 32.

The forward finishing panels 38 include fastening structure (not shown) that include, for example, snap fitting projections, that are inserted into the openings 86 of the lower side panels 34 for attachment thereto. Since forward finishing panels 38 are conventional features, further description is omitted for the sake of brevity.

A description of the installation process of the various portions of the center console assembly 16 is now provided with specific reference to FIGS. 12-21.

Figure 12:
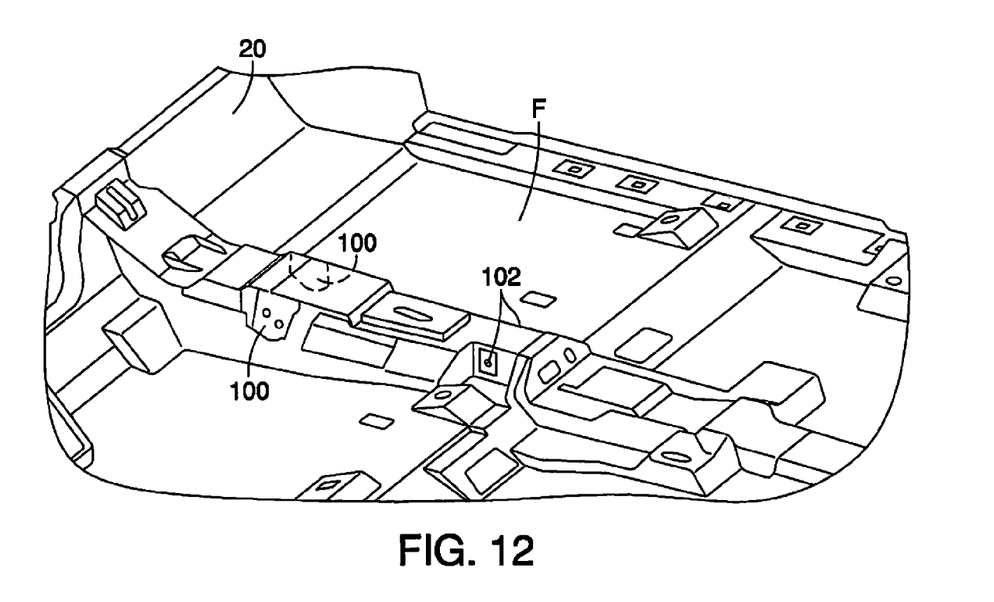
FIG. 12 is a perspective view of the floor of the passenger compartment of the vehicle with the center console assembly completely removed in accordance with the first embodiment.

As shown in FIGS. 5 and 12, the vehicle floor F includes a plurality of attachment parts 100 and 102 that are located within a central region 104 of the vehicle passenger compartment 12.

The central region 104 of the passenger compartment 12 can be a raised structure defining a tunnel that rises slightly above the remainder of the floor F or can be level with the remainder of the floor F. The central region 104 can be provided in the vehicle 10 to provide clearance for any of a variety of vehicle components, such as a rear section of a transmission, a transfer case, a drive shaft, electrical wiring and/or exhaust pipes. The attachment parts 100 and 102 can be brackets welded to the central region 104 of the floor F, but can alternatively be mechanical fasteners or threaded apertures integrally formed in the various panels that define the floor F and the central region 104.

Figure 13:
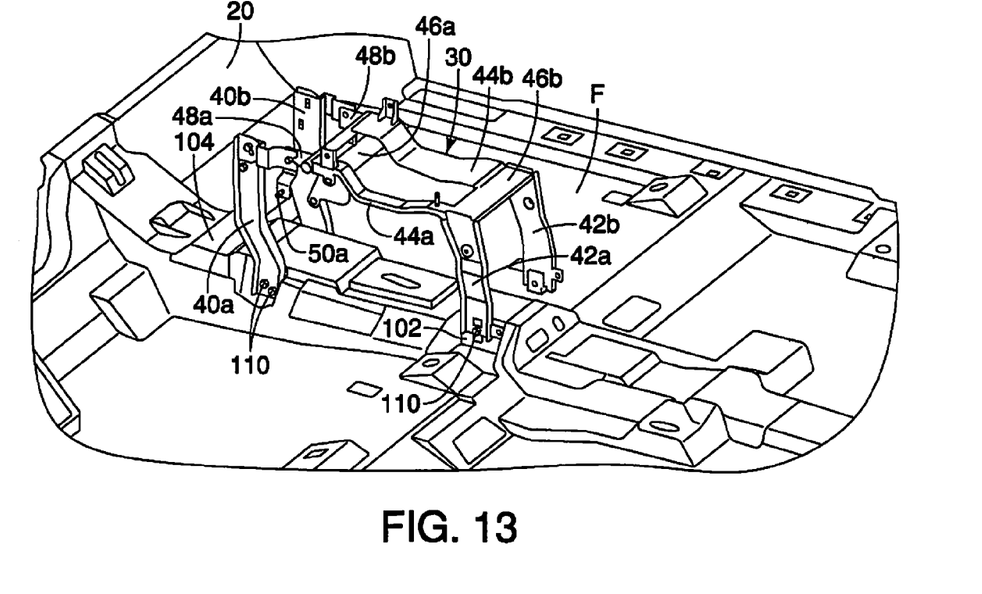
FIG. 13 is another perspective view of the floor similar to FIG. 12 showing the bracket assembly attached to the floor in accordance with the first embodiment.

As shown in FIGS. 5 and 13, the bracket assembly 30 is attached to the floor F with mechanical fasteners 110. Specifically, the mechanical fasteners 110 can be removable threaded fasteners that are used in the depicted embodiment to fasten the lower ends of the forward legs 40a and 40b, and the lower ends of the rearward legs 42a and 42b to the attachment parts 100 and 102 of the floor F. The bracket assembly 30 is dimensioned and shaped such that once the bracket assembly 30 is installed to the floor F, the studs 50a and 50b are positioned at precise locations, within predetermined engineering and manufacturing tolerances. Specifically, the studs 50a and 50b are positioned to extend in opposite outboard directions $D_o$ from the attachment brackets 48a and 48b of the bracket assembly 30 at a predetermined height above the floor F. Further, the studs 50a and 50b define alignment pins that are used to align and install the main body 32 to the bracket assembly 30 and the floor F at a predetermined location and orientation relative to the floor F.

Further, as shown in FIG. 13, once the bracket assembly 30 is installed to the floor F, the forward legs 40a and 40b, and the rearward legs 42a and 42b are vertically oriented such that they extend upward from the floor F. The side members 44a and 44b and the cross-members 46a and 46b extend in an overall horizontal orientation. Specifically, since the side members 44a and 44b have curved or non-linear contours, the side members 44a and 44b extend in an overall horizontal orientation, but are not necessarily parallel to the floor F throughout their length.

Figure 14:
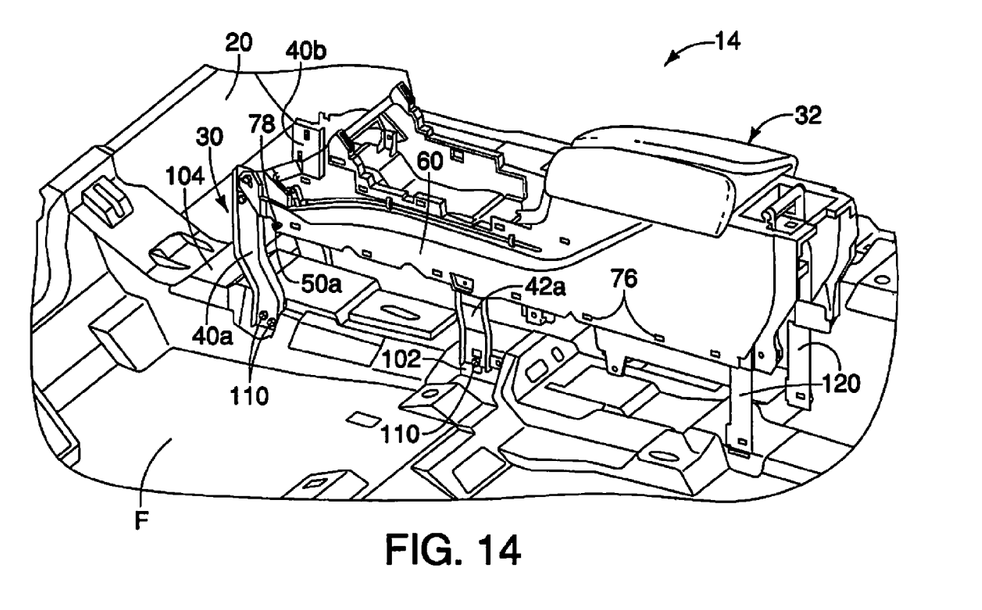
FIG. 14 is another perspective view of the floor similar to FIGS. 12 and 13 showing the main body attached to the bracket assembly in accordance with the first embodiment.
Figure 15:
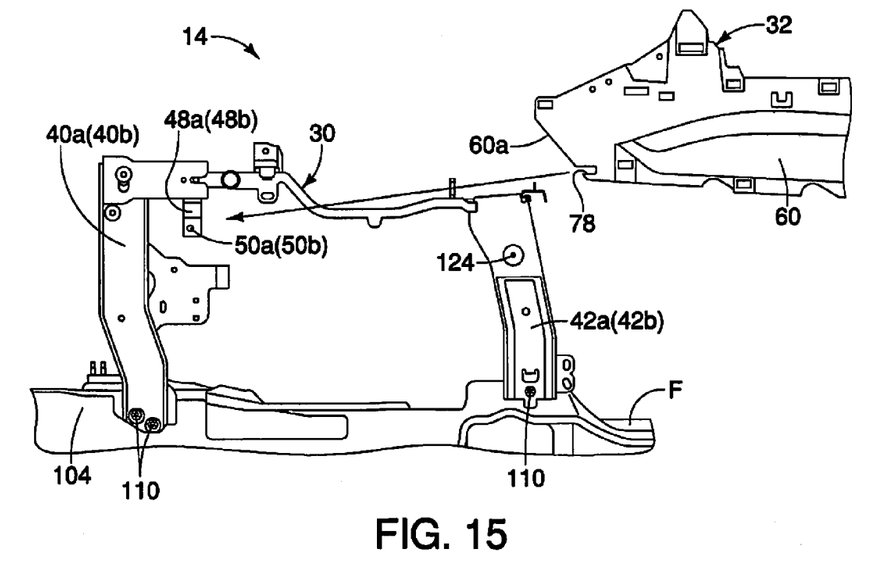
FIG. 15 is a side view of the floor of the passenger compartment of the vehicle showing the bracket assembly attached to the floor and the main body in the process of being attached to the bracket assembly in accordance with the first embodiment.
Figure 16:
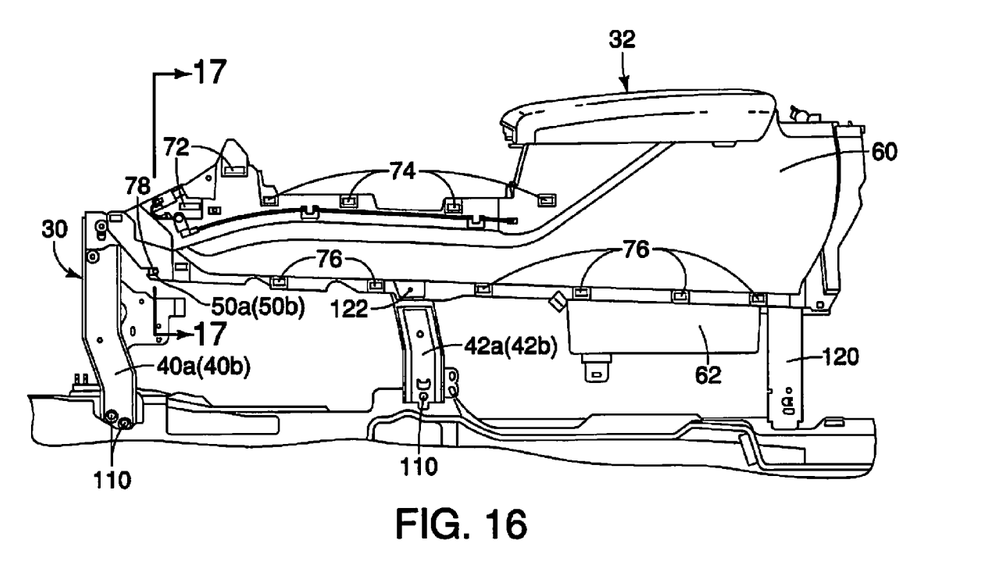
FIG. 16 is another side view of the floor similar to FIG. 15 showing the main body attached to the bracket assembly in accordance with the first embodiment.
Figure 22:
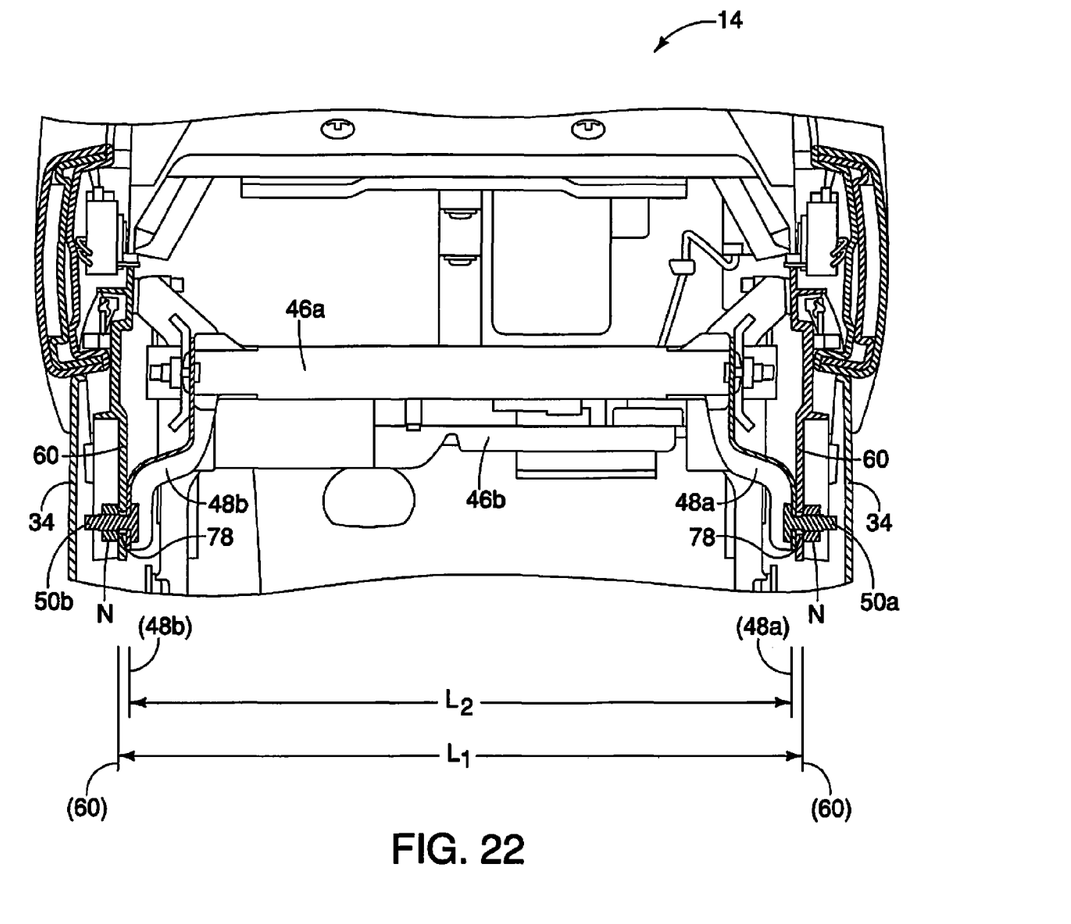
FIG. 22 is a partial front end view of the center console assembly on an enlarged scale compared to FIG. 20, showing further details of the attachment between the main body and the bracket assembly in accordance with the first embodiment.

As shown in FIG. 14, the main body 32 can be easily and simply installed to the bracket assembly 30 and the floor F. To highlight the simplicity of installation, FIGS. 15 and 16 show the positioning and installation of the main body 32 to the bracket assembly 30 and the floor F. Specifically, the main body 32 and in particular, the side panels 60 are moved from a rearward position toward the bracket assembly 30, as shown in FIG. 15. As shown in FIG. 22, inboard surfaces of the side panels 60 of the main body 32 are spaced apart from one another by a first distance $L_1$. Outboard surfaces of attachment brackets 48a and 48b of the bracket assembly 30 are spaced apart from one another by a second distance $L_2$. As shown in FIG. 22, the first distance $L_1$ is greater than the second distance $L_2$. Hence, during installation, the side panels 60 of the main body 32 are located outboard of the bracket assembly 30 such that the side panels 60 cover at least an upper portion of the bracket assembly 30.

The studs 50a and 50b extend in opposite outboard directions from the attachment brackets 48a and 48b of the bracket assembly 30 a distance that is greater than the first distance $L_1$. Therefore, as shown in FIG. 16, the main body 32 covers at least an upper portion of the bracket assembly 30. Further, as the main body 32 is fitted around the bracket assembly 30, the slots 78 are moved toward the studs 50a and 50b such that the studs 50a and 50b extend into the slots 78, once the main body 32 is properly positioned relative to the floor F, as shown in FIGS. 16, 17 and 20-22.

As shown in FIG. 16, once the main body 32 is positioned with the studs 50a and 50b (alignment pins) inserted into the slots 78, the main body 32 is properly located and aligned with the floor F and the remainder of the bracket assembly 30. In other words, the studs 50a and 50b are precisely positioned relative to the floor F with the bracket assembly 30 installed to the floor F such that the studs 50a and 50b serve as alignment pins that serve to precisely position the main body 32 relative to the floor F, within the predetermined engineering and manufacturing tolerances.

Figure 17:
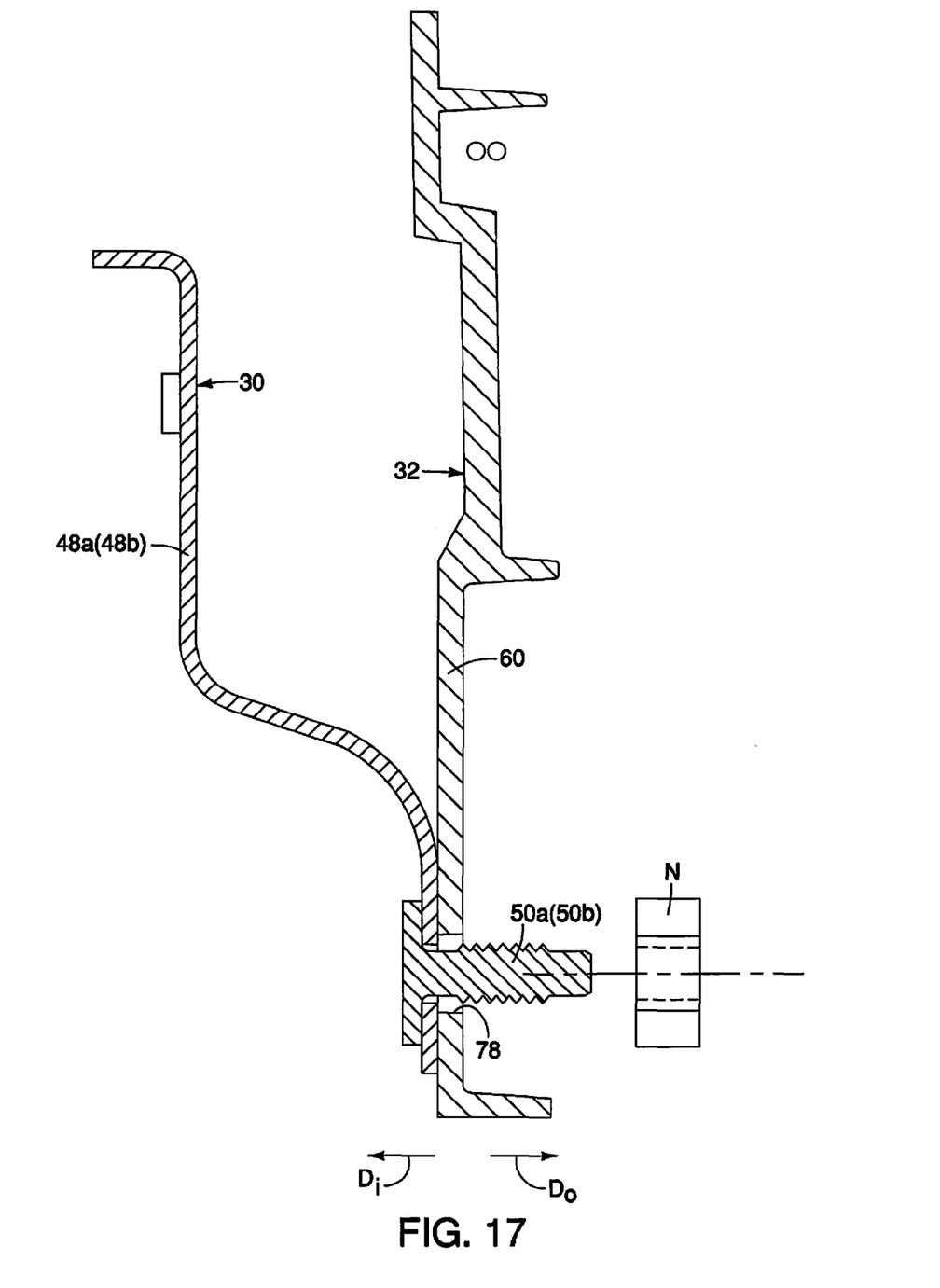
FIG. 17 is a cross-section of the center console assembly taken along the line 17-17 in FIG. 16 showing the attachment fastener and the slot in accordance with the first embodiment.

As shown in FIG. 17, a threaded fastener or nut N can be threaded onto the studs 50a and 50b in order to secure the side panels 60 and the main body 32 to the bracket assembly 30. With the main body 32 attached to the bracket assembly 30 as shown in FIGS. 14 and 16, the main body 32 itself is completely spaced apart from the floor F. Hence, the rearward sections of the main body 32, and in particular, the portion of the main body 32 supporting the storage compartment structure 62 and the compartment lid 64, is cantilevered from the bracket assembly 30. In the depicted embodiment, the rear brackets 120 do not necessarily attach to the floor, but rather are provided as attachments structures for a rear panel 130. In an alternative embodiment, the rear brackets 120 of the main body 32 can extend to the floor F and can be attached with mechanical fasteners (not shown) to the floor F. Further, openings 122 in the side panels 60 that align with openings 124 (FIG. 15) in the rearward legs 42a and 42b can also receive additional mechanical fasteners (not shown) that secure the main body 32 to the bracket assembly 30.

The combination of the studs 50a and 50b (alignment pins) and the slots 78 at forward edges of the side panels 60 of the main body 32 provide a convenient and simplified structure that provides a simplified installation of the main body 32 to the bracket assembly 30. Specifically, in conventional structures, separate threaded fasteners are employed instead of the fixed studs 50a and 50b. A technician installing the main body of the center console assembly 16 is required to insert a tool into a space inboard of the side panels 60 in order to tighten such conventional separate threaded fasteners. Whereas, in the embodiment described above, the nut N can be installed easily and simply because the studs 50a and 50b are rigidly fixed to the bracket assembly 30. Further, since the nut N is installed from an outboard side of the main body 32, tool access along an inboard side of the main body 32 is not required. This allows a single technician to perform and installation procedure that would otherwise require multiple people and/or additional complicated steps.

Figure 18:
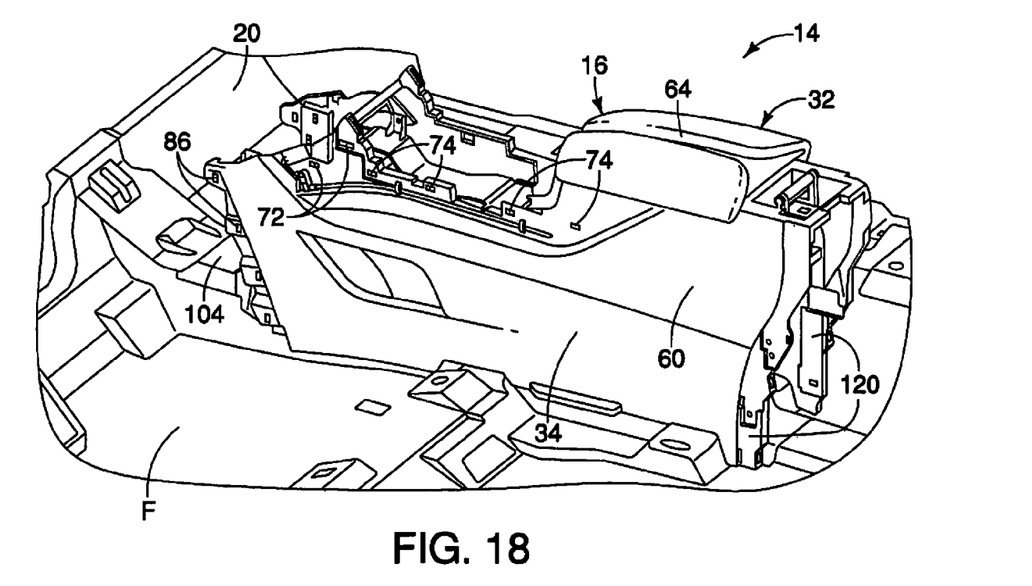
FIG. 18 is another perspective view of the floor similar to FIGS. 12, 13 and 14 showing the lower side panels and the upper side panels attached to the main body in accordance with the first embodiment.

As shown in 14 and 16, the attachment openings 76 are provided in order to install the lower side panels 34. As shown in FIG. 18, the lower side panels 34 are easily installed by inserting (not shown) the fastening structures 84 into the attachment openings 76. The fastening structures 84 are snap-fitting projections in the depicted embodiment.

Figure 19:
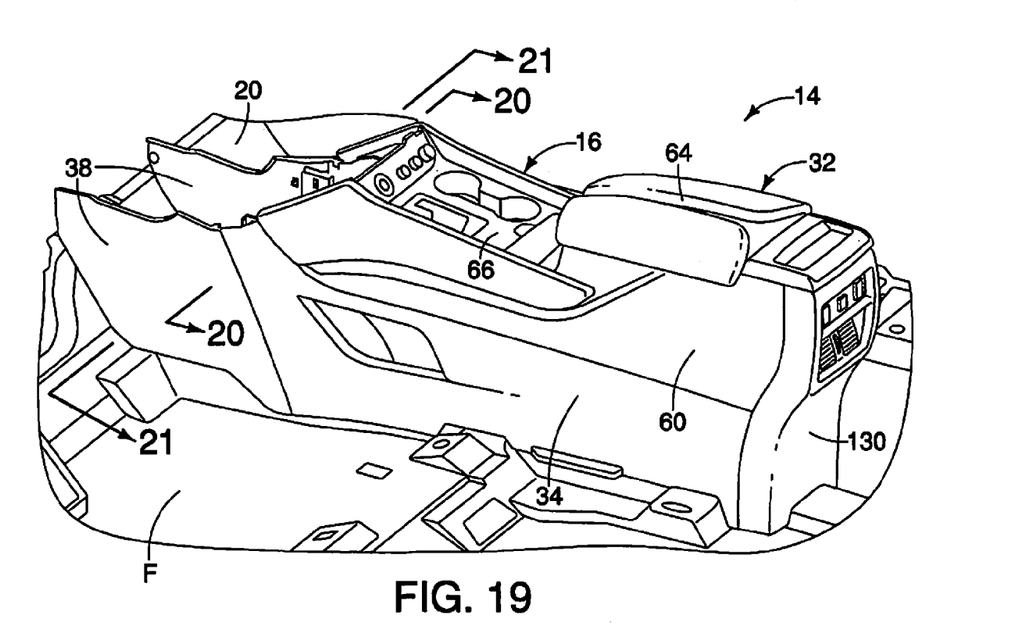
FIG. 19 is yet another perspective view of the floor similar to FIGS. 12-14 and 18 showing front finishing panels attached to the main body in accordance with the first embodiment.
Figure 20:
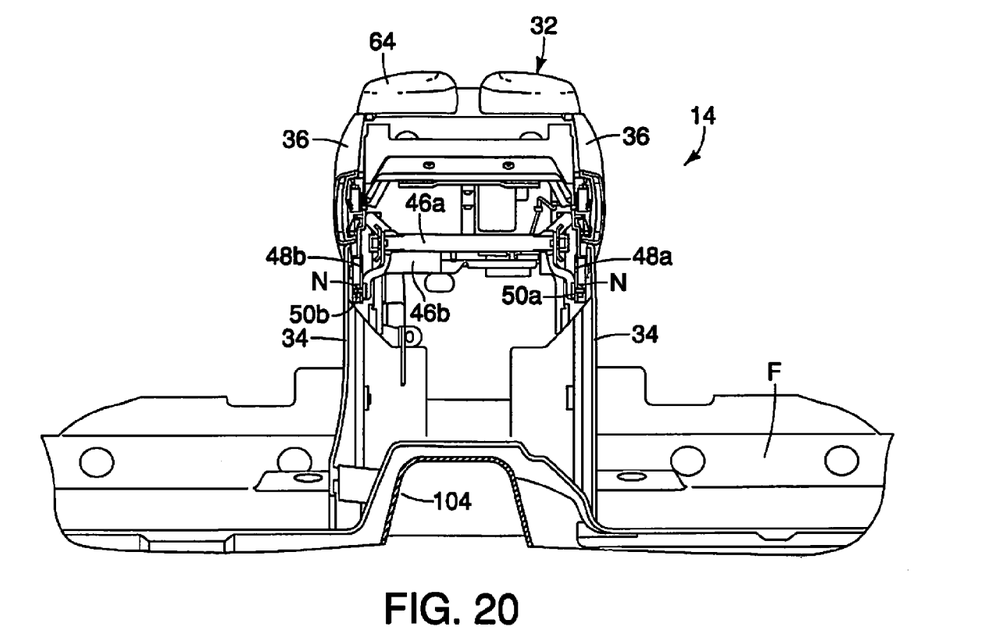
FIG. 20 is a cross-sectional view of the center console assembly taken along the line 20-20 in FIG. 19, showing the attachment between the main body and the bracket assembly in accordance with the first embodiment.
Figure 21:
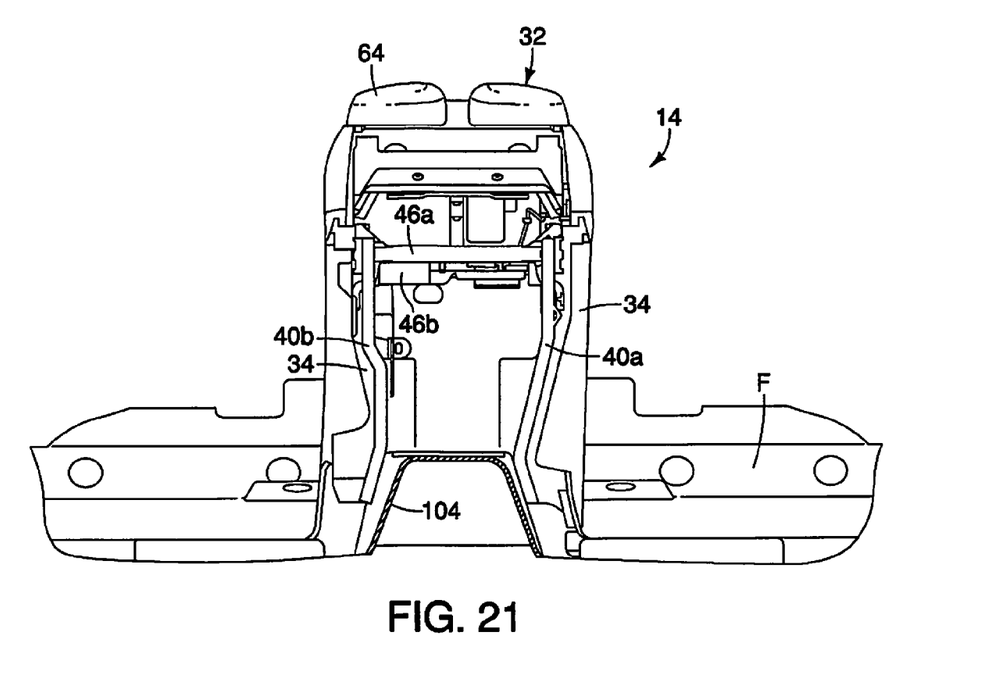
FIG. 21 is a cross-sectional view of the center console assembly taken along the line 21-21 in FIG. 19, showing the dimensional relationships between the bracket assembly and the lower side panels in accordance with the first embodiment.

As shown in FIG. 18, the attachment openings 72 and 74 are provided in the side panels 60 for the installation of the upper side panels 36 thereto. Further, the lower side panels 34 include attachment openings 86 for installation of the forward finishing panels 38. As shown in FIG. 19, the upper side panels 36 are installed with the fastening structures 94 (snap-fitting projections) being inserted into the attachment openings 72 and 74 of the side panels 60. Further, the forward finishing panels 38 include fastening structures (not shown) that are also snap-fitting projections and are inserted into the fastening openings 86.

Finally, the rear panel 130 and the shifter trim panel 66 are installed to the main body 32, as shown in FIG. 2.

A center console assembly that includes many features of the center console assembly 16, such as the upper side panels 36 and the shifter trim panel 66 can be found in for example, U.S. application Ser. No. 14/180,733, filed Feb. 2, 2014, assigned to Nissan North America. U.S. application Ser. No. 14/180,733 is incorporated herein by reference in its entirety.

As is shown in the drawings, once the lower side panels 34 are installed to the main body 32, the studs 50a and 50b (the alignment pins) and the slots 78 are concealed.

As is shown in FIG. 2, the instrument panel 24 is fixedly installed within the passenger compartment 12 above the floor F. Further, at least a forward portion of the bracket assembly 30 and a forward portion of the main body 32 extend under the instrument panel 24. More specifically, the studs 50a and 50b (the alignment pins) are located under the instrument panel 24. However, in the depicted embodiment, the instrument panel 24 and the center console assembly 16 are not directly attached to one another.

The vehicle 10 includes many conventional features and structures that are well known in the art and thus will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle trim structure. Accordingly, these terms, as utilized to describe the present invention should be interpreted relative to a vehicle equipped with the vehicle trim structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim structure comprising:
    a vehicle floor having a plurality of first attachment parts located within a central region of a vehicle passenger compartment;
    a bracket assembly having a plurality of second attachment parts and at least one alignment pin and the plurality of second attachment parts being fastened to the first attachment parts, and the at least one alignment pin being rigidly fixed to the bracket assembly;
    a main body having a horizontally extending slot along a leading edge thereof with the alignment pin being inserted into the horizontally extending slot positioning the main body relative to the bracket assembly and the vehicle floor; and
    a side trim panel installed to a side of a center console concealing the horizontally extending slot and the at least one alignment pin.

2. The vehicle trim structure according to claim 1, further comprising
    an instrument panel fixedly installed within the vehicle passenger compartment above the vehicle floor, the bracket assembly extending under the instrument panel with the at least one alignment pin being located under the instrument panel.

3. The vehicle trim structure according to claim 2, wherein
    the bracket assembly, the main body and the side trim panel are supported to the vehicle floor in the absence of a mechanical connection to the instrument panel.

4. The vehicle trim structure according to claim 1, wherein
    the at least one alignment pin includes a pair of alignment pins located at opposite lateral sides of the bracket assembly and extending away from one another, and
    the main body has a first forward edge and a second forward edge, the horizontally extending slot includes a first slot formed in the first forward edge and a second slot formed in the second forward edge, with the one of the pair of pins being inserted into the first slot and the other of the pair of pins being inserted into the second slot.

5. The vehicle trim structure according to claim 1, wherein
    the at least one alignment pin extends in a horizontal direction parallel to the vehicle floor.

6. The vehicle trim structure according to claim 1, wherein
    the at least one alignment pin includes a threaded fastener section, with the main body being fixed to the at least one alignment pin by a threaded nut that is threaded on to the threaded fastener section.

7. The vehicle trim structure according to claim 1, wherein
    the main body and the side trim panel define the center console within the vehicle passenger compartment.

8. The vehicle trim structure according to claim 7, wherein
    the main body includes a shifter trim panel receiving portion and a storage compartment receiving portion.

9. The vehicle trim structure according to claim 1, wherein
    the main body is spaced apart from the vehicle floor when attached to the bracket assembly.

10. The vehicle trim structure according to claim 1, wherein
    the at least one alignment pin and the leading edge of the main body are located at a position that is inboard of the side trim panel.

* * * * *